United States Patent
Jung et al.

(10) Patent No.: US 7,411,210 B2
(45) Date of Patent: Aug. 12, 2008

(54) SEMICONDUCTOR PROBE WITH RESISTIVE TIP HAVING METAL SHIELD THEREON

(75) Inventors: Ju-hwan Jung, Seoul (KR); Hyung-cheol Shin, Seoul (KR); Hyoung-soo Ko, Seoul (KR); Seung-bum Hong, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 196 days.

(21) Appl. No.: 11/322,340

(22) Filed: Jan. 3, 2006

(65) Prior Publication Data

US 2006/0157440 A1 Jul. 20, 2006

(30) Foreign Application Priority Data

Jan. 15, 2005 (KR) .................... 10-2005-0003977

(51) Int. Cl.
*H01L 23/58* (2006.01)
(52) U.S. Cl. ................ 257/48; 257/684; 257/E21.508; 257/E21.577; 438/48; 438/E21.154
(58) Field of Classification Search ............ 438/48–52, 438/14–18; 257/48, 492, 584, 684
See application file for complete search history.

(56) References Cited

U.S. PATENT DOCUMENTS

| 5,923,033 | A | 7/1999 | Takayama et al. |
| 6,479,892 | B1 | 11/2002 | Hopson et al. |
| 6,703,258 | B2 * | 3/2004 | Hopson et al. ............... 438/52 |
| 6,913,982 | B2 * | 7/2005 | Lim et al. .................. 438/378 |

FOREIGN PATENT DOCUMENTS

| KR | 2003-0041726 A | 5/2003 |
| KR | 2003-0044141 A | 6/2003 |
| KR | 2003-0087372 A | 11/2003 |
| WO | WO 2004/090971 A1 | 10/2004 |

* cited by examiner

*Primary Examiner*—Dung A. Le
(74) *Attorney, Agent, or Firm*—Sughrue Mion, PLLC

(57) ABSTRACT

A semiconductor probe with a resistive tip and a method of fabricating the semiconductor probe. The resistive tip doped with a first impurity includes a resistive region formed at a peak thereof and lightly doped with a second impurity opposite in polarity to the first impurity, and first and second semiconductor regions formed on sloped sides thereof and heavily doped with the second impurity. The semiconductor probe includes the resistive tip, a cantilever having an end on which the resistive tip is disposed, a dielectric layer disposed on the cantilever and covering the resistive region, and a metal shield disposed on the dielectric layer and having an opening formed at a position corresponding to the resistive region.

17 Claims, 8 Drawing Sheets

US 7,411,210 B2

SEMICONDUCTOR PROBE WITH RESISTIVE TIP HAVING METAL SHIELD THEREON

This application claims the priority of Korean Patent Application No. 10-2005-0003977, filed on Jan. 15, 2005, in the Korean Intellectual Property Office, the disclosure of which is incorporated herein in its entirety by reference.

BACKGROUND OF THE INVENTION

1. Field of the Invention

The present invention relates to a semiconductor probe with a resistive tip and a method of fabricating the same, and more particularly, to a semiconductor probe having a metal shield that exposes a resistive region of a resistive tip, and a method of fabricating the semiconductor probe.

2. Description of the Related Art

As compact products such as mobile communication terminals and pocket PCs have become more popular, the demand for highly-integrated nonvolatile micro recording media has increased. It is not easy to miniaturize existing hard disks or to highly integrate flash memories. Therefore, information storage devices using a scanning probe have been studied as an alternative.

Probes are used in various scanning probe microscopy (SPM) techniques. For example, probes are used for a scanning tunneling microscope (STM) that detects a current produced when a voltage is applied between a probe and a sample to reproduce information; an atomic force microscope (AFM) that uses an atomic force developed between a probe and a sample; a magnetic force microscope (MFM) that uses an interactive force developed between a magnetic field produced by a sample and a magnetized probe; a scanning near-field optical microscope (SNOM) that overcomes a resolution limitation caused by the wavelength of visible light; and an electrostatic force microscope (EFM) that uses an electrostatic force developed between a sample and a probe.

In order to record and reproduce information at high speed and high density using such SPM techniques, a surface charge in a small area of several tens of nanometers in diameter should be detected. Also, cantilevers should be in the form of an array to increase recording and reproduction speeds.

FIG. 1 is a schematic cross-sectional view of a resistive tip of a semiconductor probe and a storage medium, disclosed in International Patent Publication No. WO 03/096409. The semiconductor probe is vertically formed on a cantilever to protrude from the cantilever. An array of the semiconductor probes can be fabricated, and each of the semiconductor probes can be fabricated to have a diameter of tens of nanometers.

Referring to FIG. 1, a tip 50 of the semiconductor probe includes a body 58 doped with a first impurity, a resistive region 56 formed at the peak of the tip 50 and lightly doped with a second impurity, and first and second semiconductor electrode regions 52 and 54 formed on sloped sides of the tip 50 with the resistive region 56 therebetween and heavily doped with the second impurity. Here, if the first impurity is a p-type impurity, the second impurity is an n-type impurity, and if the first impurity is an n-type impurity, the second impurity is a p-type impurity.

The quantity of surface charge 57 of a recording medium 53 affects the intensity of an electric field. A change in the intensity of the electric field causes a change in the resistance of the resistive region 56. The polarity and intensity of the surface charge 57 can be detected from a variation in the resistance of the resistive region 56.

Although a depletion region 68 of the resistive tip 50 does not extend to the first and second semiconductor electrode regions 52 and 54, the volume of the resistive region 56 is reduced due to the depletion region 68, which acts as a non-conductor. Consequently, the resistance of the resistive region 56 changes, such that the polarity and intensity of the surface charge 57 can be detected.

However, in a conventional semiconductor probe with the resistive tip 50, the semiconductor electrode regions 52 and 54 formed on the sloped sides of the resistive tip 50 are affected by the surface charge 57, thereby degrading the spatial resolution of the resistive region 56.

SUMMARY OF THE INVENTION

The present invention provides a semiconductor probe with a resistive tip that has superior spatial resolution, and a method of fabricating the same.

According to a first aspect, the present invention provides a semiconductor probe comprising: a resistive tip doped with a first impurity, the resistive tip comprising: a resistive region formed at a peak thereof and lightly doped with a second impurity opposite in polarity to the first impurity; and first and second semiconductor regions formed on sloped sides thereof and heavily doped with the second impurity; a cantilever having an end on which the resistive tip is disposed; a dielectric layer covering the resistive region; and a metal shield disposed on the dielectric layer and having an opening formed at a position corresponding to the resistive region.

The dielectric layer may be made of a material selected from the group consisting of $SiO_2$, $Si_3N_4$, ONO (oxide-nitride-oxide), $Al_2O_3$, diamond like carbon (DLC), $TiO_2$, $HfO_2$, $ZrO_2$, and NiO.

The metal shield may be made of a material selected from the group consisting of Al, Au, Ti, Cr, Pt, Cu, Ni, ITO (Indium-Tin-Oxide), Ru, Ir, $IrO_2$, Ag, W, and WC.

The metal shield may be deposited to a thickness of 10 to 200 nm.

According to another aspect, the present invention provides a semiconductor probe comprising: a resistive tip doped with a first impurity, the resistive tip comprising: a resistive region formed at a peak thereof and lightly doped with a second impurity opposite in polarity to the first impurity; and first and second semiconductor electrode regions formed on sloped sides thereof and heavily doped with the second impurity; a cantilever having an end on which the resistive tip is disposed; a dielectric layer disposed on the cantilever and covering the resistive region; and a metal shield disposed on the dielectric layer and having an opening at a position corresponding to the resistive region, wherein the dielectric layer comprises a material selected from the group consisting of $SiO_2$, $Si_3N_4$, ONO, $Al_2O_3$, DLC, $TiO_2$, $HfO_2$, $ZrO_2$, and NiO, and the metal shield is deposited to a thickness of 10 to 200 nm and comprises a material selected from the group consisting of Al, Au, Ti, Cr, Pt, Cu, Ni, ITO, Ru, Ir, $IrO_2$, Ag, W, and WC.

According to yet another aspect, the present invention provides a method of fabricating a semiconductor probe, the method comprising: (a) forming a resistive tip on a top surface of a substrate doped with a first impurity, the resistive tip comprising a resistive region formed at a peak thereof and lightly doped with a second impurity opposite in polarity to the first impurity and first and second electrode regions formed on sloped sides thereof and heavily doped with the second impurity; (b) forming a dielectric layer on the substrate so that the dielectric layer can reach an end of the resistive tip; (c) forming a metal shield on the dielectric layer having an opening corresponding to the resistive region of the resistive tip; and (d) forming a cantilever by etching the bottom surface of the substrate so that the resistive tip can be disposed at an end of the cantilever.

The step (b) may comprise: forming the dielectric layer on the resistive tip to a predetermined thickness; and planarizing the dielectric layer by chemical mechanical planarization (CMP) so that the end of the resistive tip can have substantially the same height as the dielectric layer.

The step (a) may comprise: forming a stripe-shaped mask layer on the top surface of the substrate doped with the first impurity, and forming the first and second electrode regions by doping portions of the substrate not covered by the mask layer with the second impurity opposite in polarity to the first impurity; decreasing a gap between the first and second semiconductor electrode regions by annealing the substrate, and forming resistive regions lightly doped with the second impurity along outer surfaces of the first and second semiconductor electrode regions; and forming the resistive tip by patterning the mask layer into a predetermined shape and etching the top surface of the substrate not covered by the patterned mask layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
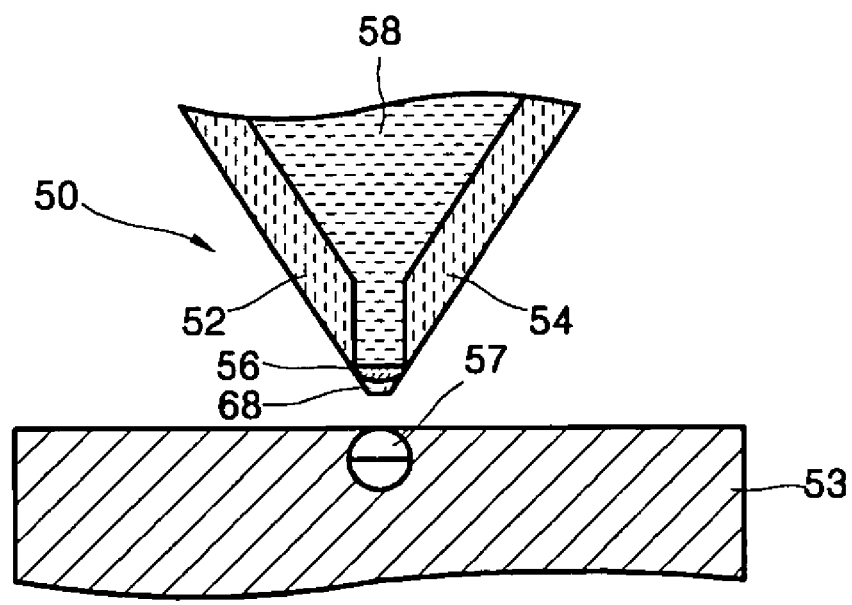
FIG. 1 is a schematic cross-sectional view of a resistive tip of a semiconductor probe and a storage medium, disclosed in International Patent Publication No. WO 03/096409.

The present invention will now be described more fully with reference to the accompanying drawings, in which embodiments of the invention are shown. However, the present invention should not be construed as being limited thereto. The thicknesses of layers and regions shown in the drawings are exaggerated for clarity.

Figure 2:
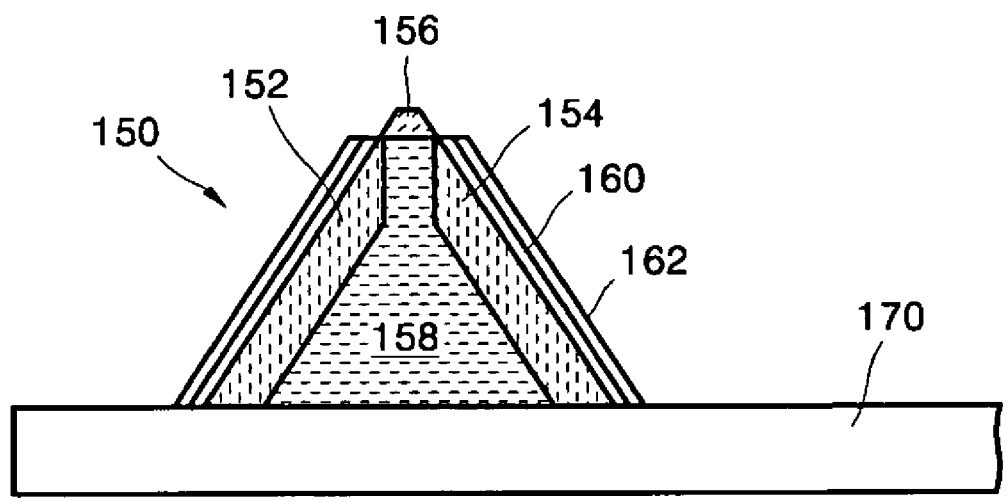
FIG. 2 is a schematic cross-sectional view of a resistive tip of a semiconductor probe according to an embodiment of the present invention.

FIG. 2 is a schematic cross-sectional view of a resistive tip of a semiconductor probe according to an embodiment of the present invention.

Referring to FIG. 2, a resistive tip 150 of the semiconductor probe is vertically formed on a cantilever 170 to protrude from one end of the cantilever 170. The resistive tip 150 includes a body 158 doped with a first impurity, a resistive region 156 formed at the peak of the resistive tip 150 and lightly doped with a second impurity, and first and second semiconductor electrode regions 152 and 154 formed on sloped sides of the resistive tip 150 with the resistive region 156 therebetween and heavily doped with the second impurity. Here, when the first impurity is a p-type impurity, the second impurity is an n-type impurity, and when the first impurity is an n-type impurity, the second impurity is a p-type impurity. A dielectric layer 160 and a metal shield 162 are sequentially formed on the first and second semiconductor electrode regions 152 and 154. The dielectric layer 160 may be made of a material selected from the group consisting of $SiO_2$, $Si_3N_4$, oxide-nitride-oxide (ONO), $Al_2O_3$, diamond like carbon (DLC), $TiO_2$, $HfO_2$, $ZrO_2$, and NiO.

A second impurity concentration at the resistive region 156 is higher than a first impurity concentration at the body 158, and lower than a second impurity concentration at the first and second semiconductor electrode regions 152 and 154.

The metal shield 162 may be made of a material selected from the group consisting of Al, Au, Ti, Cr, Pt, Cu, Ni, ITO, Ru, Ir, $IrO_2$, Ag, W, and WC.

The dielectric layer 160 and the metal shield 162 are formed to expose the resistive region 156. The metal shield 162 prevents an electric field of a surface charge 57 (see FIG. 1) of a recording medium 53 (see FIG. 1) from affecting portions excluding the resistive region 156, that is, the first and second semiconductor electrode regions 152 and 154. Accordingly, the electric field produced by the surface charge 57 affects the resistance of the resistive region 56, and the polarity and intensity of the surface charge can be exactly detected from a change in its resistance.

Figure 3:
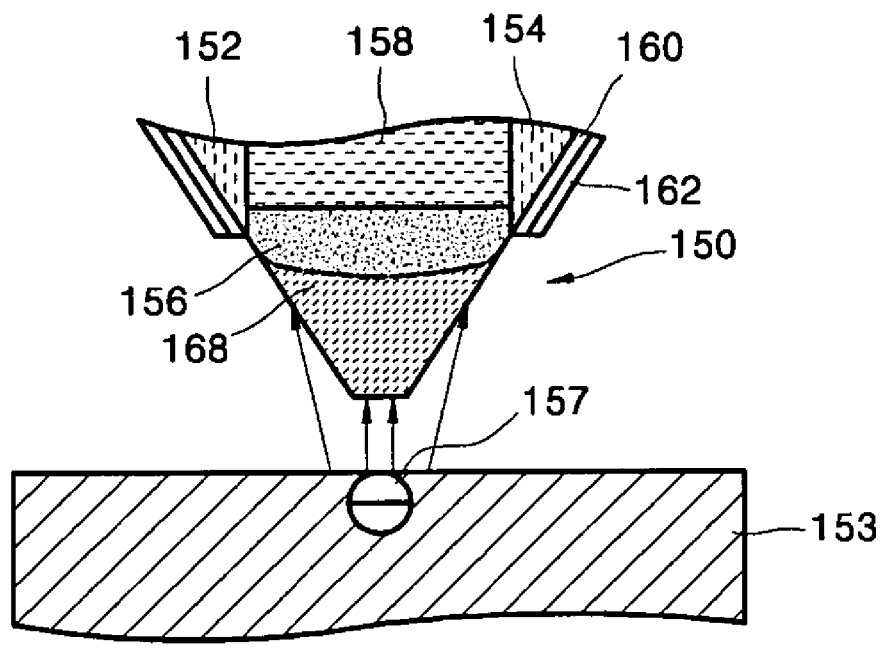
FIG. 3 is an enlarged sectional view of the end of the resistive tip of the semiconductor probe of FIG. 2.

FIG. 3 is an enlarged sectional view of the end of the resistive tip 150 of the semiconductor probe of FIG. 2.

Although a depletion region 168 of the resistive tip 150 including body 158 does not extend to the first and second semiconductor electrode regions 152 and 154, the volume of the resistive region 156 is reduced due to the depletion region 168, which acts as a non-conductor. Consequently, the resistance of the resistive region 156 changes, such that the polarity and intensity of a surface charge 157 of a recording medium 153 can be detected. The depletion region 168 formed in the resistive region 156 gradually expands toward the first and second semiconductor electrode regions 152 and 154 due to an electric field produced by the negative surface charge 157. Dielectric layer 160 and metal shield 162 are sequentially formed on the first and second semiconductor regions 152 and 154.

In the meantime, the metal shield 162 prevents the electric field from affecting the first and second semiconductor electrode regions 152 and 154 formed on both sides of the resistive region 156, thereby improving the resolution of the resistive tip 150. However, it is difficult to make the metal shield 162 illustrated in FIGS. 2 and 3 using a high resolution lithography process due to a height (approximately 1 μm or less) of the resistive tip 150.

Figure 4:
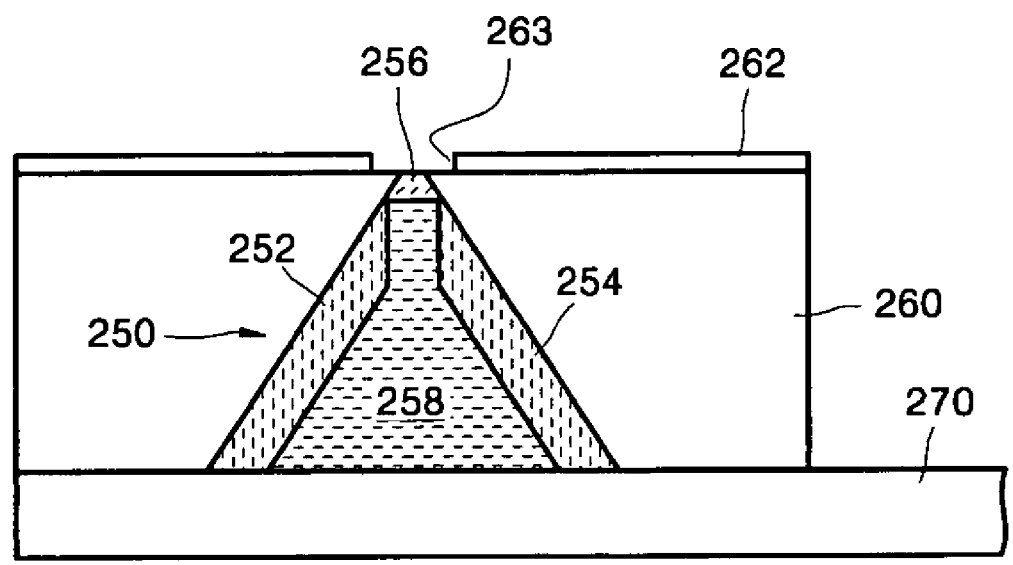
FIG. 4 is a schematic cross-sectional view of a resistive tip of a semiconductor probe according to another embodiment of the present invention.

FIG. 4 is a schematic cross-sectional view of a resistive tip of a semiconductor probe according to another embodiment of the present invention.

Referring to FIG. 4, a resistive tip 250 of the semiconductor probe is vertically formed on a cantilever 270 to protrude from one end of the cantilever 270. The resistive tip 250 includes a body 258 doped with a first impurity, a resistive region 256 formed at the peak thereof and lightly doped with a second impurity, and first and second semiconductor electrode regions 252 and 254 formed on sloped sides of the resistive tip 250 and heavily doped with the second impurity.

A dielectric layer 260 is formed on a predetermined portion of the cantilever 270 to cover the resistive region 256. The dielectric layer 260 preferably covers the end of the resistive region 256.

A metal shield 262 is formed on the dielectric layer 260 to have an opening 263 through which the resistive region 256 is exposed.

The dielectric layer 260 may be made of a material selected from the group consisting of $SiO_2$, $Si_3N_4$, ONO, $Al_2O_3$, DLC, $TiO_2$, $HfO_2$, $ZrO_2$, and NiO.

The metal shield 262 may be made of a material selected from the group consisting of Al, Au, Ti, Cr, Pt, Cu, Ni, ITO, Ru, Ir, $IrO_2$, Ag, W, and WC.

The diameter of the opening 263 may be approximately 100 nm or less, and resolution can be determined according to the diameter. The thickness of the metal shield 262 may range from 10 to 200 nm.

Since the operation of the semiconductor probe according to the present embodiment illustrated in FIG. 4 is substantially identical to that of the semiconductor probe of the embodiment illustrated in FIGS. 2 and 3, a detailed explanation thereof will not be given.

Since the metal shield 262 of the semiconductor probe according to the present embodiment illustrated in FIG. 4 is formed flatwise on the dielectric layer 260, it can be fabricated more easily than the semiconductor probe of the embodiment illustrated in FIGS. 2 and 3. That is, the opening 263 can be formed to have a desired diameter even by a general photolithography process that is well known in the field of semiconductor manufacturing technology. Further, when the semiconductor probe reads data by contacting a storage medium in which a surface charge is stored, since the semiconductor probe is a resistive probe with the planar metal shield 262, a pressure applied to the storage medium can be reduced.

FIGS. 5A through 5J are perspective views illustrating sequential steps of a method of fabricating the semiconductor probe of FIG. 4 according to an embodiment of the present invention.

Figure 5A:
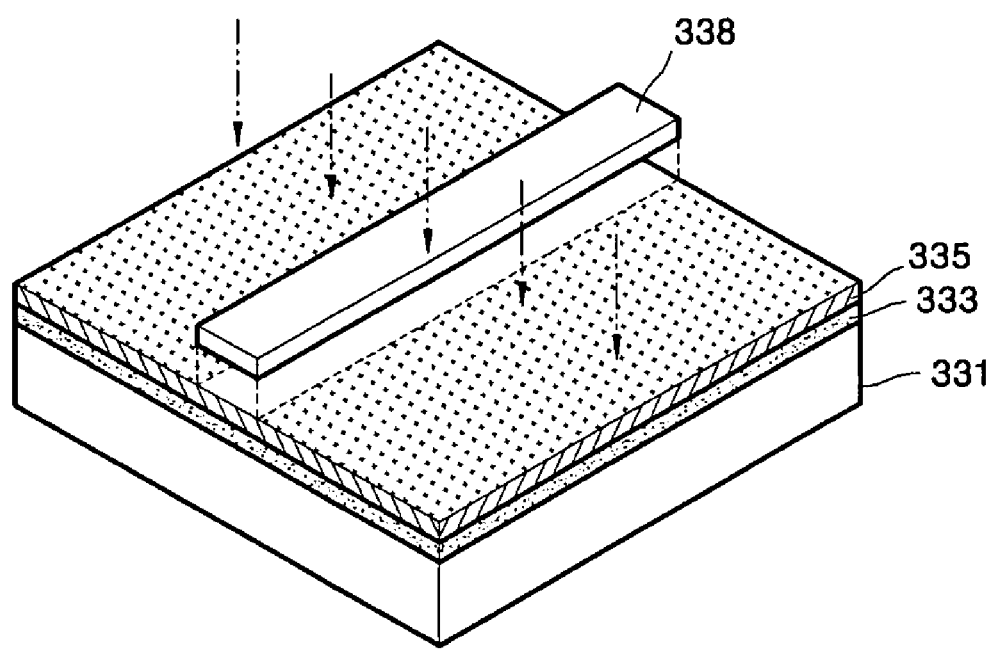
FIGS. 5A through 5J are perspective views illustrating sequential steps of a method of fabricating the semiconductor probe of FIG. 4 according to an embodiment of the present invention.

First, referring to FIG. 5A, a mask layer 333, such as a silicon oxide layer or a silicon nitride layer, is formed on the surface of a silicon substrate 331 or a silicon on insulator (SOI) substrate which is doped with a first impurity, photoresist 335 is coated on a top surface of the mask layer 333, and then a stripe-shaped mask 338 is disposed over the photoresist 335.

Figure 5B:
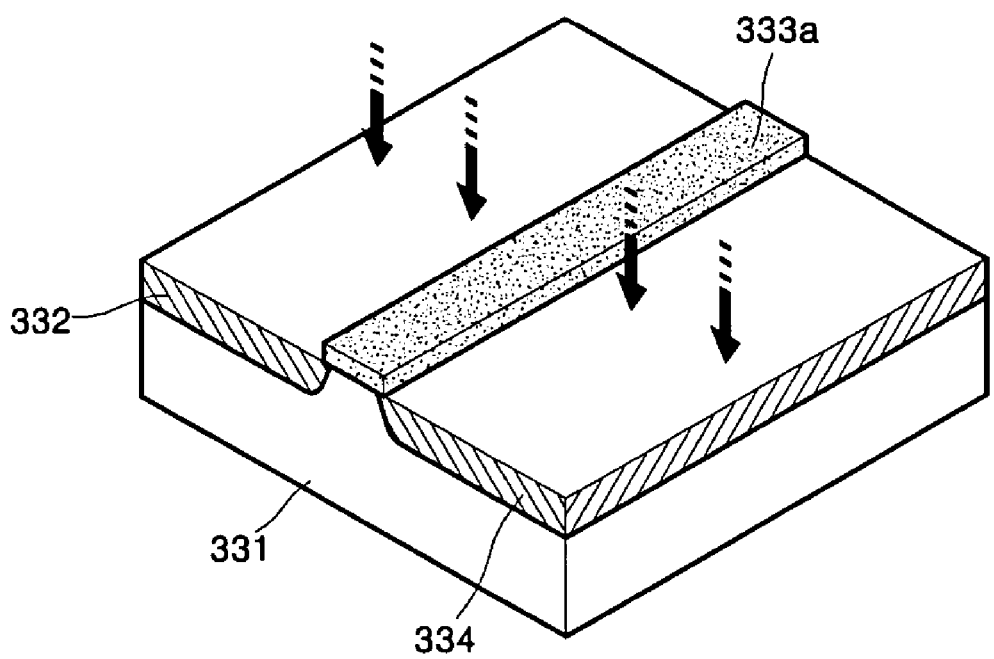

Next, the resultant structure is exposed, developed, and etched to pattern the same. Referring to FIG. 5B, a stripe-shaped mask layer 333a is formed on the substrate 331 through a photolithographic etching process, and portions of the substrate 331 not covered by the mask layer 333a are heavily doped with a second impurity to form first and second semiconductor electrode regions 332 and 334. Since the first and second semiconductor electrode regions 332 and 334 have low resistivity, they function as conductors.

Figure 5C:
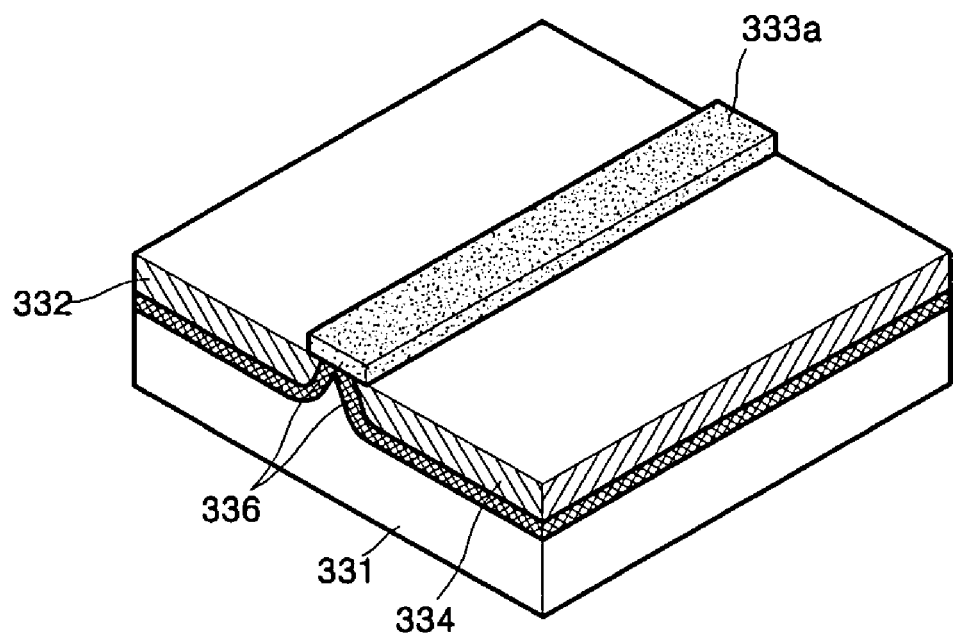

Next, a width between the first and second semiconductor electrode regions 332 and 334 is reduced to be less than the width of the mask layer 333a by an annealing process. Referring to FIG. 5C, by expanding the first and second semiconductor electrode regions 332 and 334 heavily doped with the second impurity, the second impurity is diffused to portions contiguous with the heavily doped first and second semiconductor electrode regions 332 and 334 to form resistive regions 336 lightly doped with the second impurity. The resistive regions 336 under the mask layer 333a come in contact with each other to form a tip forming portion of the resistive tip.

The tip forming portion may be formed in a thermal oxidation process, which will be explained later.

Figure 5D:
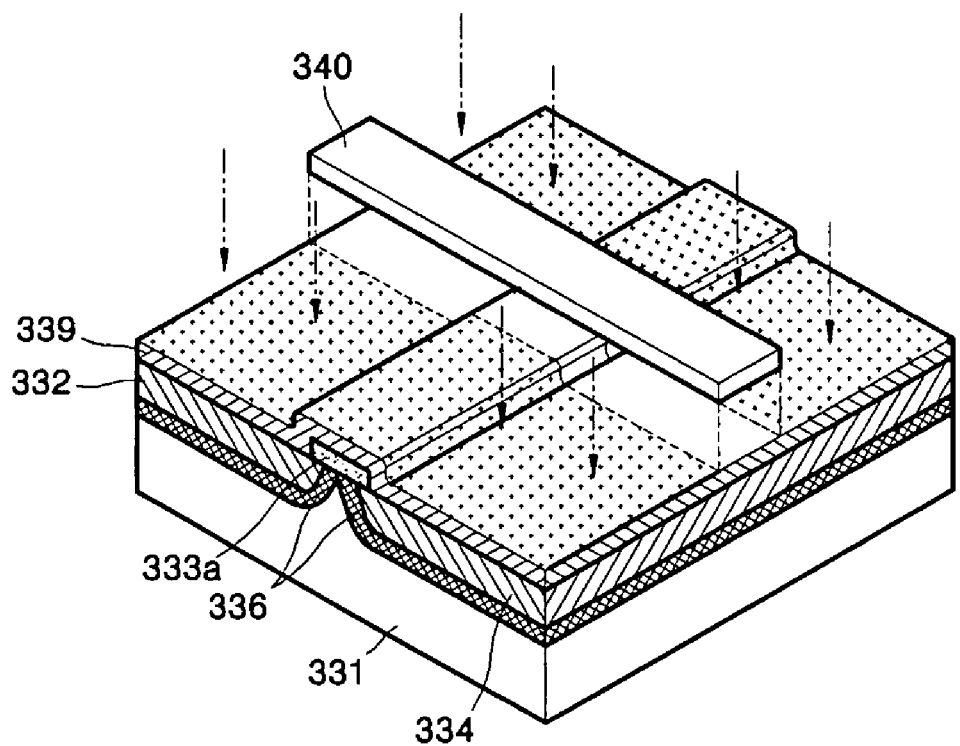
Figure 5E:
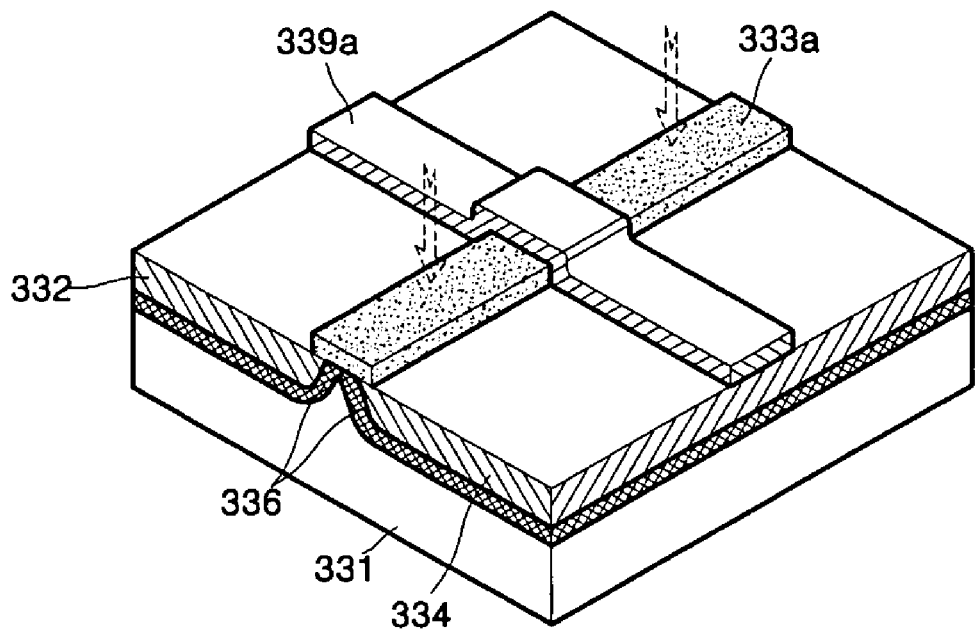

Next, referring to FIG. 5D, photoresist 339 is coated on the substrate 331 to cover the mask layer 333a, and then a stripe-shaped photo mask 340 is disposed over the photoresist 339 perpendicularly to the mask layer 333a. Referring to FIG. 9E, the resultant structure is exposed, developed, and etched to form photoresist layer 339a having the same shape as the photo mask 340.

Figure 5F:
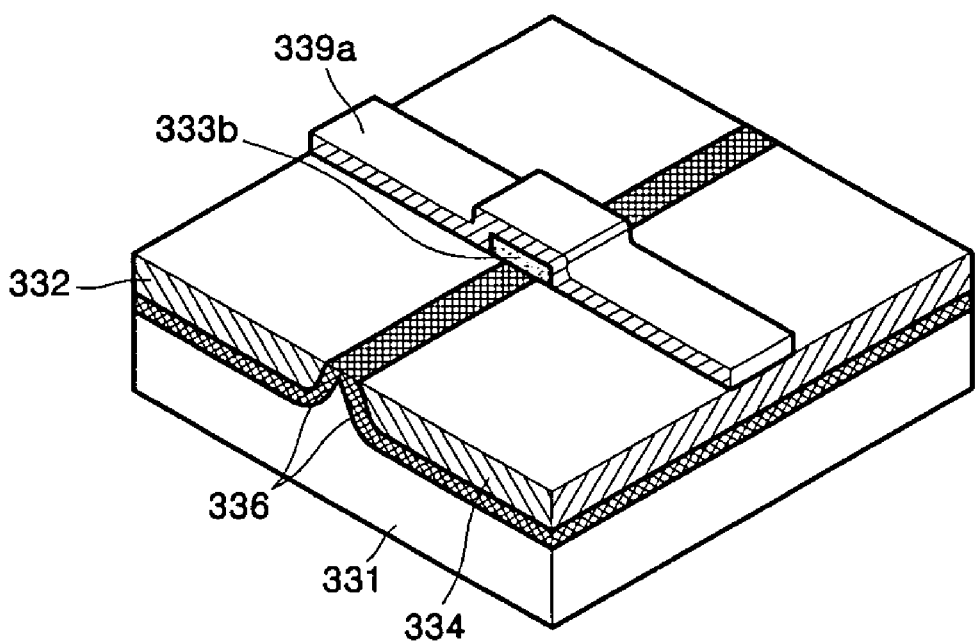

Next, referring to FIG. 5F, the mask layer 333a not covered by photoresist 339a is dry etched to form a square mask layer 333b.

Figure 5G:
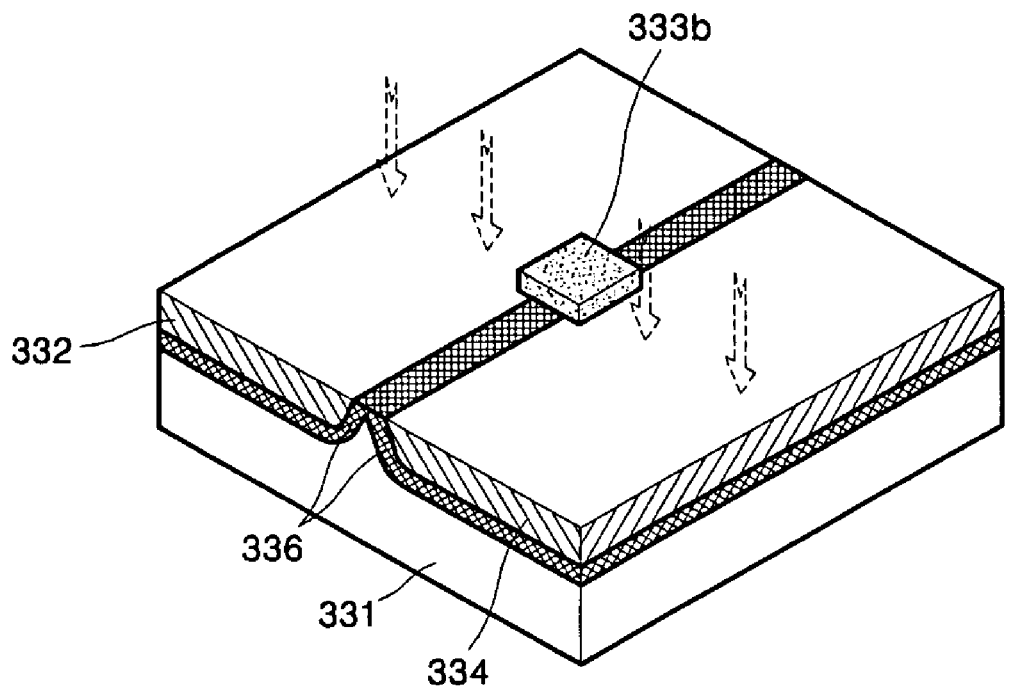
Figure 5H:
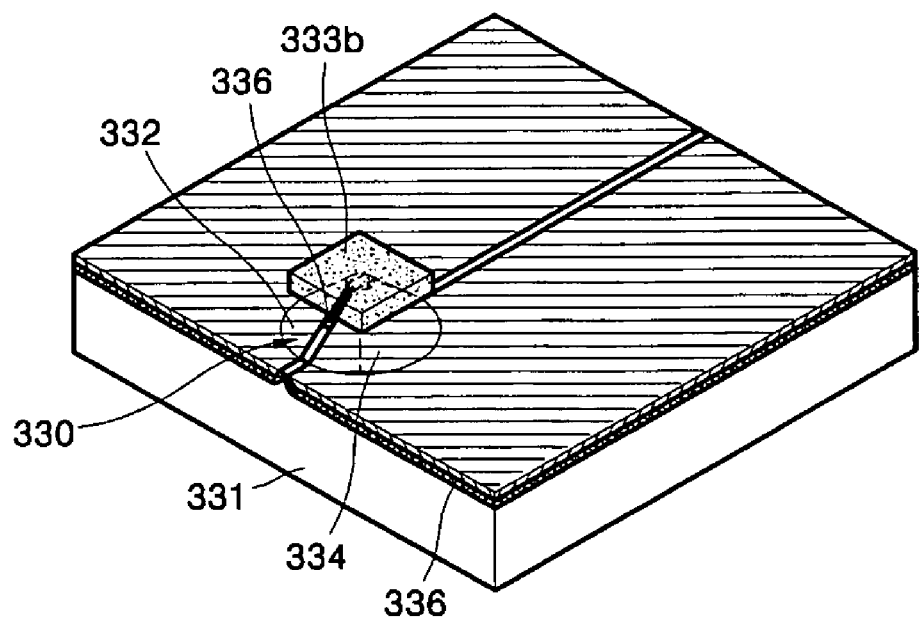

Next, referring to FIG. 5G, the photoresist 339a is removed. Referring to FIG. 5H, the substrate 331 is dry or wet etched using the square mask layer 333b as a mask, such that the first and second semiconductor electrode regions 332 and 334 are disposed on sloped sides of the resistive tip 330 and the resistive regions 336 are aligned at the peak of the resistive tip 330.

Next, the mask layer 333b is removed, and the substrate 331 is heated in an oxygen atmosphere to form a silicon oxide layer (not shown) of a predetermined thickness on the top surface of the substrate 331. The oxide layer is removed to sharpen the ends of the resistive regions 336. Due to the thermal oxidation process, the resistive regions 336 can contact each other while the resistive tip 330 is sharpened.

Figure 5I:
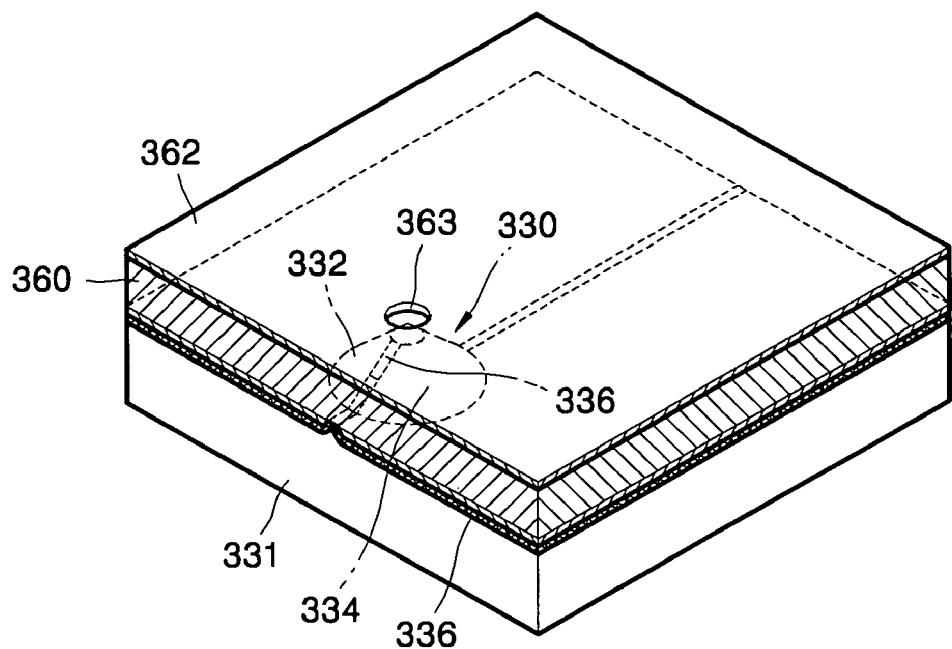

Referring to FIG. 5I, a dielectric layer 360 is deposited on the substrate 331 to cover the resistive tip 330. The dielectric layer 360 may be made of a material selected from the group consisting of $SiO_2$, $Si_3N_4$, ONO, $Al_2O_3$, DLC, $TiO_2$, $HfO_2$, $ZrO_2$, and NiO. The dielectric layer 360 on the end of the resistive tip 330 is planarized by chemical-mechanical polishing (CMP). A metal material selected from the group consisting of Al, Au, Ti, Cr, Pt, Cu, Ni, ITO, Ru, Ir, $IrO_2$, Ag, W, and WC is deposited on the dielectric layer 360 to form a metal shield 362. The metal shield 362 is deposited to a thickness of approximately 10 to 200 nm. A portion of the metal shield 362 corresponding to the resistive region 336 is removed by patterning to form an opening 363 having a predetermined diameter (e.g., tens of nanometers).

Figure 5J:
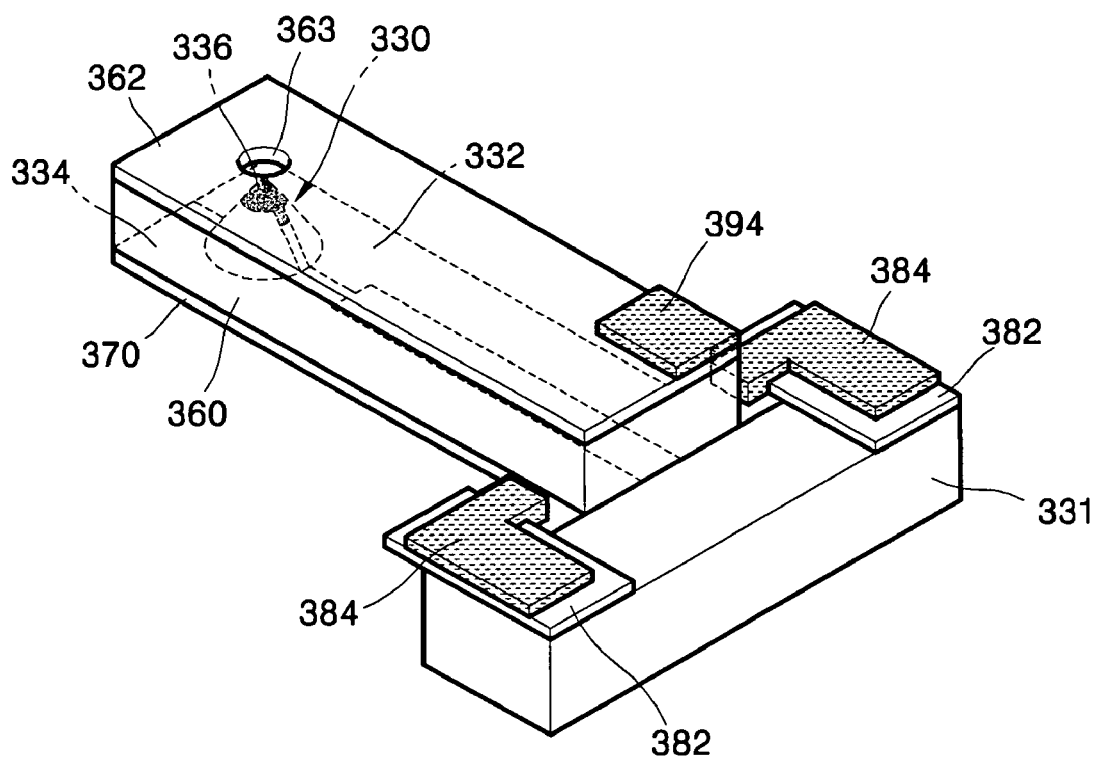

Next, referring to FIG. 5J, the bottom surface of the substrate 331 is etched so that the resistive tip 330 can be disposed at one end of a cantilever 370. The first and second semiconductor electrode regions 332 and 334 are connected to electrode pads 384 that are insulated by insulating layers 382 on the substrate 331 to complete a semiconductor probe. An electrode pad 394 for a ground voltage is formed on the metal shield 362.

In the fabricating method of semiconductor probe according to the present embodiment, an ion implantation process for forming the first and second semiconductor electrode regions 332 and 334 is performed before the resistive tip 330 is fabricated. Accordingly, a fine photolithographic etching process can be performed and the resistive region 336 can be easily formed through thermal diffusion. Further, after the resistive tip 330 is fabricated, the dielectric layer 360 and the metal shield 362 are deposited on the substrate 331 and the opening 363 is formed by patterning, such that the metal shield 362 is easily implemented.

Figure 6:
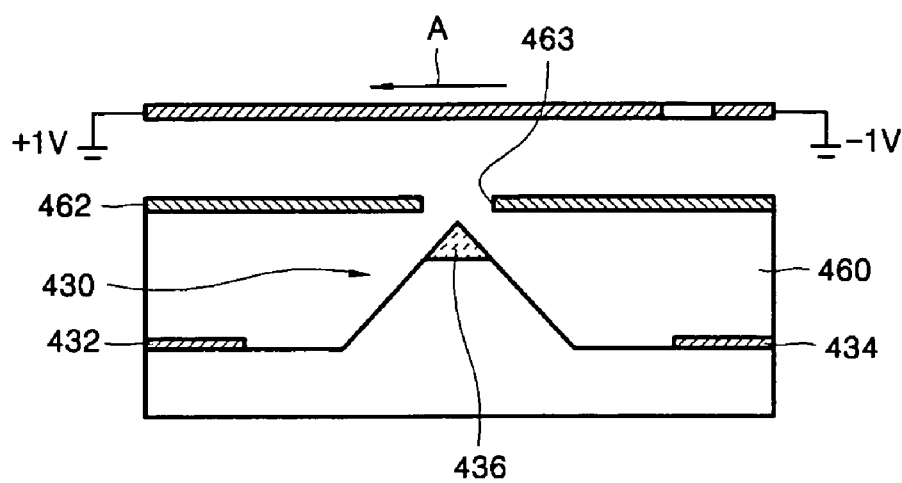
FIG. 6 is a cross-sectional view of a probe used in a simulation to compare resolutions of the resistive probe with a metal shield of FIG. 4 and a resistive probe without a metal shield.
Figure 7:
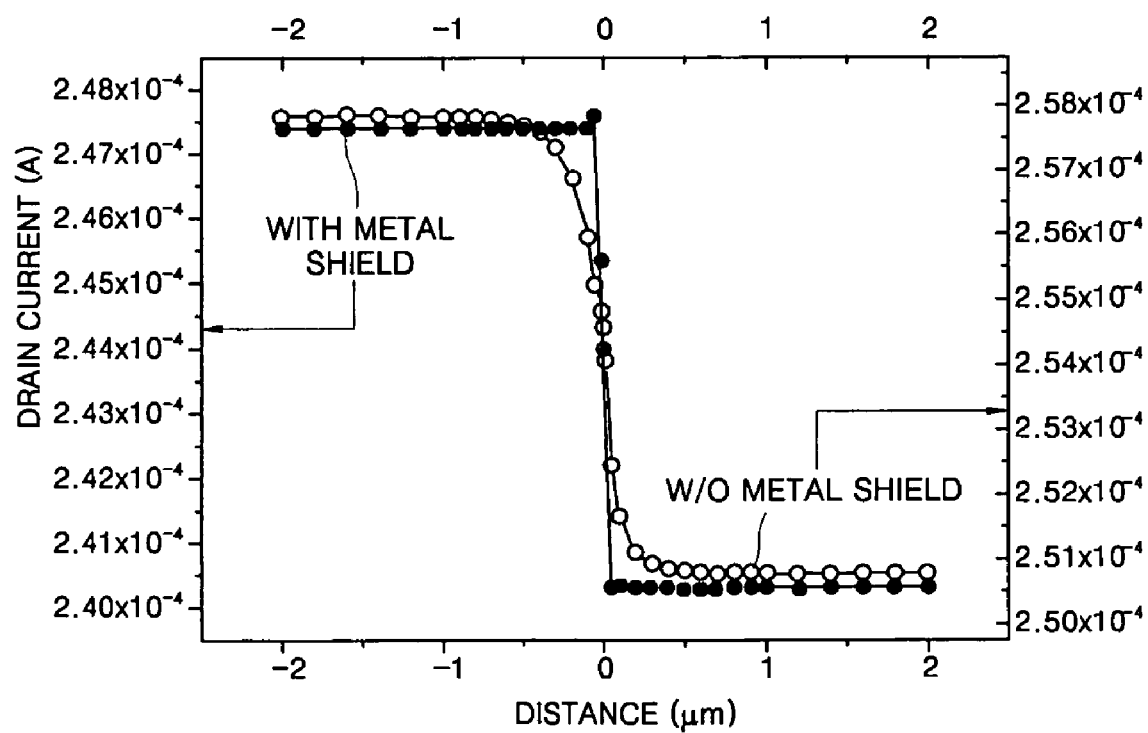
FIG. 7 is a graph illustrating a variation of drain current according to surface charge when the probe of FIG. 6 is used.

FIG. 6 is a cross-sectional view of a probe used in a simulation to compare resolutions between the resistive probe with the metal shield according to the embodiment illustrated in FIG. 4 and a probe without a metal shield. FIG. 7 is a graph illustrating a variation of drain current according to surface charge when the probe of FIG. 6 is used.

Referring to FIG. 6, source and drain electrodes 432 and 434 were formed on both sides of a resistive tip 430, and a metal shield 462 having an opening 463 to expose a resistive region 436 of the resistive tip 430 was formed on a dielectric layer 460 that covers the resistive tip 430. The opening 436 of the metal shield 460 had a diameter of 100 nm, and a metal with a floating voltage was distanced 15 nm from the metal shield 460. The floating voltage was varied from +1V to −1V, and the drain current of the probe 430 was calculated by moving the floating voltage in a direction marked by the arrow A. After measurement, the resistive tip without a metal shield had a transition width of 112 nm between the two opposite charges (plus and minus) whereas the resistive tip with the metal shield had a very sharp transition width of 23 nm between the opposite charges (plus and minus). It can be seen from the measurement results that the resolution of the resistive tip is improved on account of the metal shield.

According to the semiconductor probe with the resistive tip of the present invention, the resistive tip is protected by the dielectric layer, and a surface contacting the surface of the storage medium is wide, thereby reducing pressure applied by the semiconductor probe to the storage medium. Also, the resolution of the semiconductor probe is improved on account of the metal shield.

According to the method of fabricating the semiconductor probe with the resistive tip of the present invention, the metal shield disposed on the plane can be easily fabricated.

In addition, when the semiconductor probe according to the present invention is applied to a high capacity, ultra-small information storage device using a scanning probe microscopy technique, a charge present in a small region can be detected to reproduce information and a charge can be formed in a small region to record information.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A semiconductor probe comprising:
 a resistive tip doped with a first impurity, the resistive tip comprising:
 a resistive region formed at a peak of the resistive tip and lightly doped with a second impurity opposite in polarity to the first impurity; and
 first and second semiconductor regions formed on sloped sides of the resistive tip and heavily doped with the second impurity;
 a cantilever having an end on which the resistive tip is disposed;
 a dielectric layer substantially covering the first and second semiconductor regions; and
 a metal shield disposed on the dielectric layer and having an opening formed at a position corresponding to the resistive region.

2. The semiconductor probe of claim 1, wherein the dielectric layer comprises a material selected from the group consisting of SiO2, Si3N4, ONO, Al2O3, diamond like carbon (DLC), TiO2, HfO2. ZrO2, and NiO.

3. The semiconductor probe of claim 1, wherein the metal shield comprises a material selected from the group consisting of Al, Au, Ti, Cr, Pt, Cu, Ni, ITO, Ru, Ir, IrO2, Ag, W, and WC.

4. The semiconductor probe of claim 3, wherein the metal shield is deposited to a thickness of 10 to 200 nm.

5. The semiconductor probe of claim 1, wherein the first impurity is a type impurity, and the second impurity is an n-type impurity.

6. The semiconductor probe of claim 1, wherein the first impurity is an n-type impurity, and the second impurity is a p-type impurity.

7. The semiconductor probe of claim 1, wherein the resistive region is not substantially covered by the dielectric layer and is not substantially covered by the metal shield.

8. A semiconductor probe comprising:
 a resistive tip doped with a first impurity, the resistive tip comprising:
 a resistive region formed at a peak of the resistive tip and lightly doped with a second impurity opposite in polarity to the first impurity; and
 first and second semiconductor electrode regions formed on sloped sides of the resistive tip and heavily doped with the second impurity:
 a cantilever having an end on which the resistive, tip is disposed;
 a dielectric layer disposed on the cantilever and substantially covering the first and second semiconductor electrode regions; and
 a metal shield disposed on the dielectric layer and having an opening at a position corresponding to the resistive region,
 wherein the dielectric layer comprises a material selected from the group consisting of SiO2, Si3N4, ONO, Al2O3, DLC, TiO2, HfO2, ZrO2, and NiO, and the metal shield is deposited to a thickness of 10 to 200 nm and comprises a material selected from the group consisting of Al, Au, Ti, Cr, Pt, Cu, Ni, ITO, Ru, Ir, IrO2, Ag, W, and WC.

9. The semiconductor probe of claim 8, wherein the resistive region is not substantially covered by the dielectric layer and is not substantially covered by the metal shield.

10. A semiconductor probe comprising:
 a resistive tip doped with a first impurity, the resistive tip comprising:
 a resistive region formed at a peak of the resistive tip and lightly doped with a second impurity opposite in polarity to the first impurity; and
 first and second semiconductor electrode regions formed on sloped sides of the resistive tip and heavily doped with the second impurity;
 a canlilever having an end on which the resistive tip is disposed; and
 a dielectric layer and a metal shield sequentially stacked on the sloped sides of the resistive tip, substantially covering the first and second semiconductor electrode regions, and exposing the resistive tip.

11. The semiconductor probe of claim 10, wherein the dielectric layer comprises a material selected from the group consisting of SiO2, Si3N4, ONO, Al2O3, DLC, TiO2, HfO2, ZrO2, and NiO.

12. The semiconductor probe of claim 10, wherein the metal shield comprises a material selected from the group consisting of Al, Au, Ti, Cr, Pt, Cu, Ni, ITO, Ru, Ir, IrO2, Ag, W, and WC.

13. The semiconductor probe of claim 10, wherein the first impurity is a p-type impurity, and the second impurity is an n-type impurity.

14. The semiconductor probe of claim 10. wherein the first impurity is an n-type impurity, and the second impurity is a p-type impurity.

15. The semiconductor probe of claim 10, wherein the resistive region is not substantially covered by the dielectric layer and is not substantially covered by the metal shield.

16. A semiconductor probe comprising:
a resistive tip doped with a first impurity, the resistive tip comprising:
a resistive region formed at a peak of the resistive tip and lightly doped with a second impurity opposite in polarity to the first impurity; and
first and second semiconductor electrode regions formed on sloped sides of the resistive tip and heavily doped with the second impurity;
a cantilever having an end on which the resistive tip is disposed;
a dielectric layer and a metal shield sequentially stacked on the sloped sides of the resistive tip, stantially covering the first and second semiconductor electrode regions, and exposing the resistive region,
wherein the dielectric layer comprises a material selected from the group consisting of SiO2, Si3N4, ONO, Al2O3, DLC, TiO2, HfO2, ZrO2, and NiO, and the metal shield comprises a material selected from the group consisting of Al, Au, Ti, Cr, Pt, Cu, Ni, ITO, Ru, Ir, IrO2, Ag, W, and WC.

17. The semiconductor probe of claim 16, wherein the resistive region is not substantially covered by the dielectric layer and is not substantially covered by the metal shield.

* * * * *